US012789826B2

(12) United States Patent
Zhang et al.

(10) Patent No.: US 12,789,826 B2
(45) Date of Patent: Nov. 10, 2026

(54) PROBABILISTIC PREDICTION OF OCCLUDED PEDESTRIANS AND OTHER ANIMATE OBJECTS IN AUTOMOTIVE ENVIRONMENTS

(71) Applicant: Waymo LLC, Mountain View, CA (US)

(72) Inventors: Yunheng Zhang, Fremont, CA (US); Yuncheng Li, San Mateo, CA (US); Chiyu Jiang, Sunnyvale, CA (US); Kaifei Chen, Santa Clara, CA (US); Zheng Sun, Saratoga, CA (US); Yue Huang, Sunnyvale, CA (US)

(73) Assignee: Waymo LLC

( * ) Notice: Subject to any disclaimer, the term of this patent is extended or adjusted under 35 U.S.C. 154(b) by 67 days.

(21) Appl. No.: 18/943,391

(22) Filed: Nov. 11, 2024

(65) Prior Publication Data

US 2026/0131805 A1 May 14, 2026

(51) Int. Cl.
*B60W 50/06* (2006.01)
*B60W 60/00* (2020.01)

(52) U.S. Cl.
CPC ........ *B60W 50/06* (2013.01); *B60W 60/0016* (2020.02); *B60W 2554/40* (2020.02); *B60W 2554/80* (2020.02)

(58) Field of Classification Search
CPC ............. B60W 50/06; B60W 60/0016; B60W 2554/40; B60W 2554/80
See application file for complete search history.

(56) References Cited

U.S. PATENT DOCUMENTS

| | | | | |
|---|---|---|---|---|
| 10,037,613 | B1 * | 7/2018 | Becker | G06T 7/246 |
| 10,460,182 | B1 * | 10/2019 | Park | G01S 7/415 |
| 11,643,115 | B2 * | 5/2023 | Torres | B60W 50/0097 701/23 |
| 11,669,980 | B2 * | 6/2023 | Maurer | G06T 7/269 382/107 |

(Continued)

FOREIGN PATENT DOCUMENTS

EP 4244692 B1 8/2024

OTHER PUBLICATIONS

Extended European Search Report for European Application No. 25214922.4, mailed Jan. 9, 2026, 11 Pages.

(Continued)

*Primary Examiner* — Mussa A Shaawat
(74) *Attorney, Agent, or Firm* — Van Hoven PC; Jordan Becker

(57) ABSTRACT

The disclosed systems and techniques are directed to identifying and responding to presence of target objects in occluded areas of driving environments. The techniques include training, using perception data associated with a first driving scene, a first machine learning model (MLM) to determine a location, within the first driving scene, of a target object masked with a masking transformation. The techniques further include training, using an output of the first MLM for a training driving scene, a second MLM to generate a map of probabilities of one or more target objects to be in an occluded region of the training driving scene, the training driving scene comprising at least one of the first driving scene or a second driving scene, and causing the second MLM to be deployed on an autonomous vehicle.

20 Claims, 8 Drawing Sheets

(56) References Cited

U.S. PATENT DOCUMENTS

| | | | | |
|---|---|---|---|---|
| 11,767,038 | B2 * | 9/2023 | Iglesias | B60W 30/146 701/301 |
| 11,951,975 | B1 * | 4/2024 | Luders | G01S 17/931 |
| 12,060,082 | B1 | 8/2024 | Garimella et al. | |
| 12,110,042 | B1 * | 10/2024 | Hoang | B60W 50/0097 |
| 12,205,379 | B2 * | 1/2025 | Fiedler | G06V 20/58 |
| 12,291,236 | B1 * | 5/2025 | Akman | B60W 10/20 |
| 12,417,644 | B1 * | 9/2025 | King | G06V 10/22 |
| 12,600,385 | B1 * | 4/2026 | Papi | B60W 60/0027 |
| 2017/0329332 | A1 * | 11/2017 | Pilarski | B60W 50/0097 |
| 2018/0322640 | A1 * | 11/2018 | Kim | B60W 30/09 |
| 2018/0341822 | A1 * | 11/2018 | Hovis | G06F 18/251 |
| 2019/0079526 | A1 * | 3/2019 | Vallespi-Gonzalez | G06V 20/58 |
| 2019/0244368 | A1 * | 8/2019 | Fang | G08G 1/16 |
| 2020/0026282 | A1 * | 1/2020 | Choe | B60W 60/001 |
| 2020/0143177 | A1 * | 5/2020 | Naser | G06V 20/58 |
| 2020/0278681 | A1 * | 9/2020 | Gier | G05D 1/0088 |
| 2020/0307566 | A1 * | 10/2020 | Ghose | B60W 30/09 |
| 2021/0064889 | A1 * | 3/2021 | Iglesias | B60W 30/146 |
| 2021/0278853 | A1 * | 9/2021 | Gier | G05D 1/0088 |
| 2021/0312811 | A1 * | 10/2021 | Ohlarik | G08G 1/20 |
| 2022/0092412 | A1 * | 3/2022 | Srivastava | G06N 3/04 |
| 2022/0262133 | A1 * | 8/2022 | Iglesias | B60W 30/146 |
| 2023/0351243 | A1 | 11/2023 | Xia et al. | |
| 2023/0368660 | A1 * | 11/2023 | Ghafarianzadeh | B60W 60/0027 |
| 2023/0391375 | A1 * | 12/2023 | Iglesias | B60W 30/146 |
| 2024/0087333 | A1 | 3/2024 | Hari et al. | |
| 2024/0119294 | A1 * | 4/2024 | Alomrani | G06N 3/084 |
| 2024/0166197 | A1 * | 5/2024 | Rocchi | B60W 30/0956 |
| 2024/0190452 | A1 * | 6/2024 | Mirkovic | G08G 1/096791 |
| 2024/0203084 | A1 * | 6/2024 | Sharma | G06T 5/77 |
| 2024/0311616 | A1 * | 9/2024 | Donderici | G07C 5/0808 |
| 2025/0182435 | A1 * | 6/2025 | Singh | G06V 10/26 |
| 2025/0308194 | A1 * | 10/2025 | Petit | G06V 10/22 |

OTHER PUBLICATIONS

Gao, S., et al., "Part Representation Learning with Teacher-Student Decoder for Occluded Person Re-Identification," International Conference on Acoustics, Speech and Signal Processing (ICASSP), IEEE, Apr. 14, 2024, pp. 2660-2664, XP034653815.

Yang, S., et al., "Diffusion Model-Based Pedestrian De-Occlusion Method Using a Monocular Camera Sensor for Indoor Visual Localization," Sensors Journal, IEEE, vol. 23 (22), Nov. 15, 2023, pp. 28421-28429, XP011953356.

* cited by examiner

PROBABILISTIC PREDICTION OF OCCLUDED PEDESTRIANS AND OTHER ANIMATE OBJECTS IN AUTOMOTIVE ENVIRONMENTS

TECHNICAL FIELD

The instant specification generally relates to autonomous vehicles. More specifically, the instant specification relates to detection of occluded pedestrians and other animate objects in automotive environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
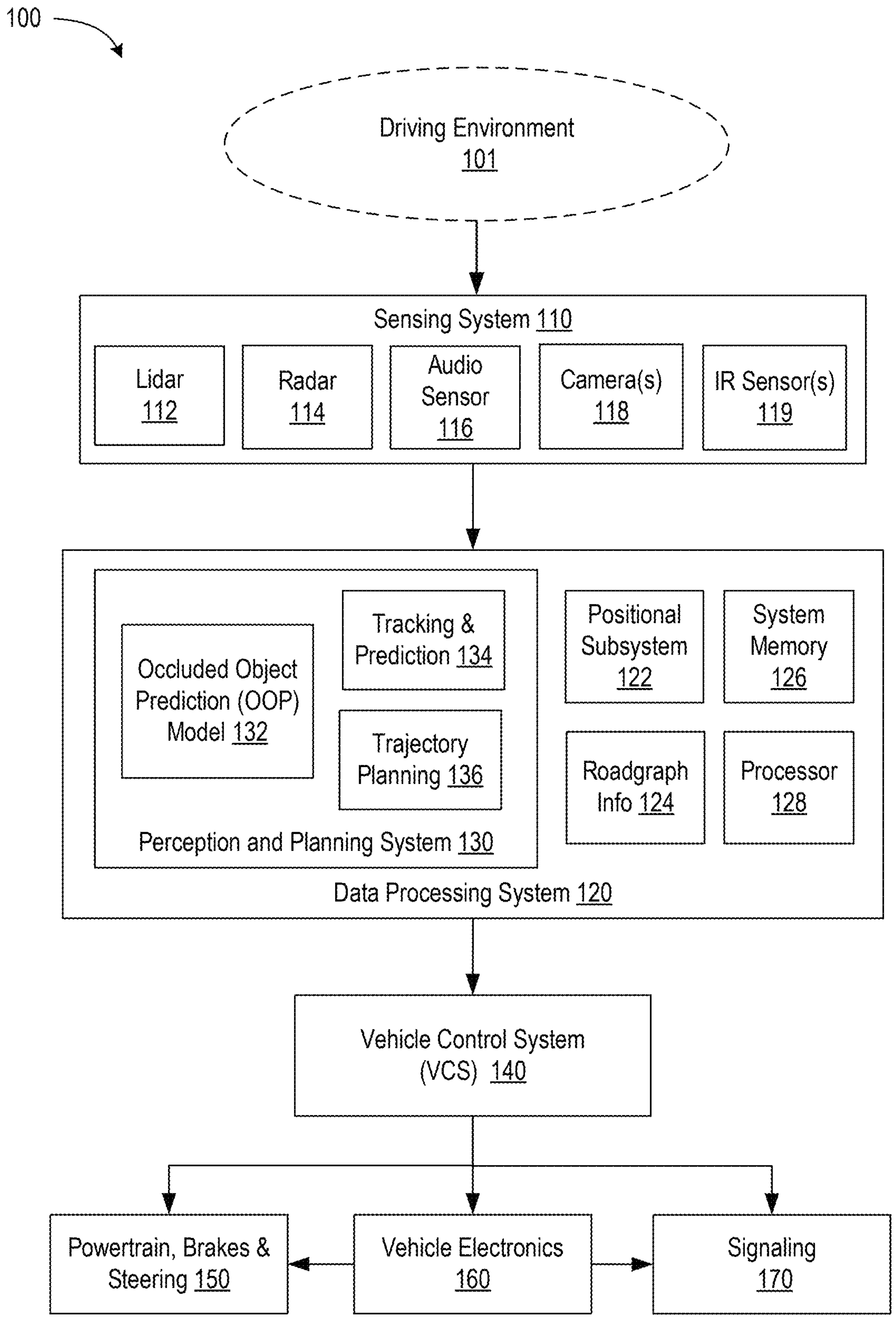
FIG. 1 is a diagram illustrating components of an example autonomous vehicle (AV) capable of deploying systems that predict presence of target objects in occluded areas of driving environments, in accordance with some implementations of the present disclosure.

In one implementation, disclosed is a method that includes training, using perception data associated with a first driving scene, a first machine learning model to determine a location, within the first driving scene, of a target object masked with a masking transformation. The method further includes training, using an output of the first machine learning model for a training driving scene, a second machine learning model to generate a map of probabilities of one or more target objects to be in an occluded region of the training driving scene, the training driving scene comprising at least one of the first driving scene or a second driving scene, and causing the second machine learning model to be deployed on an autonomous vehicle.

In another implementation, disclosed is a system that includes a memory device and one or more processing devices communicatively coupled to the memory device. The one or more processing devices are to train, using perception data associated with a first driving scene, a first machine learning model to determine a location, within the first driving scene, of a target object masked with a masking transformation. The one or more processing devices are further to train, using an output of the first machine learning model for a training driving scene, a second machine learning model to generate a map of probabilities of one or more target objects to be in an occluded region of the training driving scene, the training driving scene comprising at least one of the first driving scene or a second driving scene, and cause the second machine learning model to be deployed on an autonomous vehicle.

In yet another implementation, disclosed is a computing system of a fleet of autonomous vehicles, that includes a first memory device and a processing device communicatively coupled to the first memory device. The processing device is to train, using perception data associated with a first driving scene, a first machine learning model to determine a location, within the first driving scene, of a target object masked with a masking transformation. The processing device is further to train, using an output of the first machine learning model for a training driving scene, a second machine learning model to generate a map of probabilities of one or more target objects to be in an occluded region of the training driving scene, the training driving scene comprising at least one of the first driving scene or a second driving scene, and cause the second machine learning model to be deployed on an autonomous vehicle of the fleet of autonomous vehicles.

DETAILED DESCRIPTION

An autonomous vehicle (AV) or a vehicle deploying various driver assistance features can use multiple sensor modalities to facilitate detection and identification of objects in the driving environments and tracking trajectories of these objects. Sensors can include radio detection and ranging (radar) sensors, light detection and ranging (lidar) sensors, multiple digital cameras, sonars, geolocation sensors, positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars, by virtue of their sub-micron optical wavelengths, have high spatial resolution, which allows obtaining many closely spaced return points from the same object. This enables accurate detection and tracking of objects once the objects are within the reach of lidar sensors. Lidars have an operating range of 150-350 m, depending on a specific lidar model, with higher ranges typically achieved by more powerful and expensive systems.

Radar sensors are inexpensive, require less maintenance than lidar sensors, have a large working range of distances, and have a good tolerance of adverse weather conditions. As a result of much longer (radio) wavelengths used by radars, resolution of radar data is much lower than that of lidars. In particular, while radars are capable of accurate determination of velocities of objects moving with not too small velocities (relative to the radar receiver), detecting accurate locations of objects can be often problematic.

Cameras (e.g., photographic or video cameras) can acquire high resolution images at both shorter distances (where lidars operate) and longer distances (where lidars do not reach. Cameras capture two-dimensional projections of the three-dimensional outside space onto an image plane (or some other non-planar imaging surface). Cameras have a longer, than lidars, operating range but determine positions of objects with a higher error along the radial direction compared with the lateral directions.

Camera and lidar images (as well as radar images, in some applications) can be processed by various object detection models, including deep learning neural network models. Such models can determine positions and orientations of objects and evolution of the positions and orientations of the objects with time. These models can further classify the objects by type (e.g., truck, car, school bus, motorcyclist, pedestrian, and/or the like), manufacturer, model, and/or the like.

Typical driving environments, especially urban environments, include many occluded areas that can hide pedestrians and/or other animate objects, such as wheelchair riders, scooter riders, animals, e.g., dogs, and/or the like. For example, a bus or a tram can occlude a substantial area of an environment with people who are exiting the bus and/or are about to step on the roadway to cross it. Similarly, a person can be occluded by a structure (e.g., a bus stop, a billboard, etc.) or by a group of other people and may be walking in a direction that is different from where the group is headed. For example, a flow of pedestrians crossing a side street can occlude a person moving in a perpendicular direction (e.g., along the side street) and who is about to run across the main street, in front of an AV. Occluded objects can further include other vehicles, e.g., vehicles crossing occluded intersections and capable of crossing or approaching the AV's trajectory. To ensure safety of its driving operations, an AV has to anticipate presence of occluded pedestrians in areas not immediately visible to its sensors (cameras, lidars, radars, etc.) and select a driving path and speed that allows the AV to respond timely to pedestrians or other animate objects emerging from occluded areas. On the other hand, the AV cannot react strongly to every remote possibility that a person/animate object appears from an area not immediately visible since such reactions would result in significant disruptions of the traffic flow for other vehicles and road users.

Existing approaches to occluded pedestrian detection include using various heuristics associated with specific driving situations, e.g., doubly parked cars, stopped buses, structures bigger than a certain size, etc. Heuristics, however, do not exhaust the multitude of different scenarios encountered in driving situations and invariably miss at least some occluded areas in difficult or unusual cases. Additionally, heuristics fail to consider a broader context provided by other objects in the environments that can be informative about which occluded regions are likely to have (or not have) pedestrians or other target objects.

Aspects and implementations of the instant disclosure address these and other challenges of the existing autonomous driving perception and planning technology by providing for systems and techniques capable of estimating a likelihood that a pedestrian may be located in an occluded region of a driving environment and determining whether the likelihood is sufficiently large and/or the location is sufficiently proximate to the vehicle to warrant changing the vehicle's trajectory. In one example implementation, the disclosed systems and techniques include training an off-board teacher model to predict, based on training data collected during driving missions, probabilities $p(x, y|c, r)$ that occluded objects exist at various locations x, y within the driving environment of the vehicle characterized by a driving context c and roadgraph r. The roadgraph r refers to a map of drivable surfaces (e.g., roads, streets, lanes, driveways, and/or the like) whereas context c refers to objects present within the driving environment. In one example, roadgraph r can include a map of polylines corresponding to various driving lanes, lane turns/splits/merges/starts/ends, and/or the like, and can also include current status of traffic lights in the driving environment. Context c can include bounding boxes (or other bounding shapes) for various objects in the environment, identification of types of the objects, speed and direction of the objects' motion, acceleration, and/or the like.

The predicted probabilities generated by the teacher model can then be used as ground truth for training a more compact student model capable of deploying on-board a vehicle and predicting how likely various occluded regions are to harbor a pedestrian (or some other animate object) invisible to the vehicle's sensors.

In some implementations, the teacher model can be a diffusion model whose processing times exceed those that are expected of a live sensing data processing model whereas the student model can be a much faster neural deep-learning network capable of making predictions about occluded regions in real time. More specifically, to generate a training dataset for the teacher model, perception data logs (including both context and roadgraph data) can be collected for multiple driving episodes. For example, a driving episode can include a multi-frame (e.g., 10-second or some other suitable duration) portion of a vehicle's path along a city street. The perception data logs can include types and locations of various objects identified (using camera/lidar/ radar imaging data) at different times of a given driving episode. The perception data logs can undergo filtering to remove frames of the driving episodes in which no pedestrians or other target objects of interest (e.g., dogs or other animals) are present.

To generate training inputs into the teacher model, locations of one or more target objects for a particular time (e.g., frame) of a given driving episode can be masked, e.g., by adding noise to the object(s) actual location and shifting the object's location, $x_0, y_0 \rightarrow x_1 = x_0 + \Delta x_1$, $y_1 = y_0 + \Delta y_1$ using a random shift $\Delta x_1$, $\Delta y_1$ selected from a suitable reference distribution, e.g., a normal (Gaussian) distribution with a suitably selected variance (width of that distribution). This process can be repeated for additional shifts, $x_t, y_t \rightarrow x_{t+1}, y_{t+1}$, e.g., for the total of T shifts until the final locations of the object $x_T$, $y_T$ are randomized over various (e.g., all possible) locations in the driving episode (e.g., subject to the constraint that the object is not to be placed in locations occupied by other objects.) A teacher model can then be trained to perform the denoising process and reverse the random steps starting from the final location: $x_T, y_T \rightarrow x_{T-1}, y_{T-1} \rightarrow \ldots \rightarrow x_1, y_1 \rightarrow x_0, y_0$, to recover the actual (ground truth) location of the object, $x_0$, $y_0$, given the current context c and roadgraph information r. As a result, the teacher model learns to predict correct target object location given (random) initial location and context/roadgraph information, $p_\theta(x_0, y_0 | x_T, y_T; c, r)$, via a series of reverse steps, $p_\theta(x_P, y_P | x_T, y_T; c, r) = p_\theta(x_P, y_P | x_1, y_1; c, r) \ldots p_\theta(x_{T-1}, y_{T-1} | x_T, y_T; c, r)$, parameterized using a set of learned teacher model parameters $\theta$ (e.g., neural weights and biases). Training of the teacher model can include changing the model parameters $\theta$ in a way that brings the generated distributions $p_\theta(x_P, y_P | x_T, y_T; c, r)$ of predicted locations $x_P$, $y_P$ closer to the ground truth distributions $p_\theta(x_0, y_0 | x_T, y_T; c, r)$ of target objects. A suitable loss function, e.g., a mean square average loss function $L = (x_P - x_P)^2 + (y_P - y_0)^2$ can be used to evaluate and quantify errors between the predicted $(x_P, y_P)$ and the actual $(x_0, y_0)$ locations of the target objects and adjust model parameters $\theta$ to minimize the loss L. Accordingly, the teacher model learns to make accurate predictions as to where the targets are likely to be in view of the context and roadgraph information. For example, the teacher model can learn that a pedestrian is more likely to be present on a sidewalk or a street crossing than in the middle of the roadway, that a pedestrian is more likely to be near an open car door of a parked car than near the same parked car with all doors closed, and/or the like.

A trained diffusion model can take several seconds or even more to generate a distribution of likely locations of target objects for a given driving scene (represented by the context c and roadgraph information r). Even though such a model can be too slow to deploy on board an autonomous vehicle (at least unless very substantial on-board processing and memory resources are deployed to speed up operations of the model), the trained diffusion model can be used as a teacher model to train a much faster student model, e.g., a deep learning network, such as a transformer-based network or a similar network, to generate, for a particular driving scene, probabilities that target objects are present at various locations in the scene. The student model can process the same-type perception data, e.g., roadgraph r for a driving scene and context c that includes bounding boxes for various objects in the environment, types of the objects, motion of the objects, and/or the like. In some implementations, the student model can operate in conjunction with a spatial awareness module (SAM) that first identifies regions in the driving scene not visible from the vantage point of the vehicle's sensing system, e.g., regions occluded by one or more vehicles, poles, buildings, structures, and/or the like. This speeds up the computations and eliminates processing of areas that cannot physically harbor occluded objects (e.g., because such areas are within a direct view of the sensors of the vehicle). The student model can predict, for these SAM-identified occluded regions, the probabilities $p(x, y|c, r)$ that can be compared with the corresponding predictions $p_0(x, y|c, r)$ generated by the trained teacher model for the same regions. Such distillation training causes the outputs of the student model to approximate the ground truth distributions, $p(x, y|c, r) \rightarrow p_0(x, y|c, r)$.

The trained student model can be used for inference during autonomous driving missions. Regions of driving environments predicted by the student model to have probabilities $p_S(x, y|c, r) \geq q$ that exceed a certain empirically set threshold q (which can depend on a type of the environment, distances to occluded objects, speed of the vehicle, and/or the like) can be treated as likely locations of occluded target objects capable of interfering with the vehicle's motion. The vehicle can then take one or more preventive actions, e.g., slowing down, changing lanes or otherwise moving away from the likely locations hosting such target objects, and/or perform some combination of such actions. The specific response can depend on a distance from the vehicle to the occluded areas, density and/or speed of traffic, and/or the like.

Numerous other implementations are disclosed herein. The advantages of the disclosed techniques and systems include, but are not limited to, quick and accurate prediction of likely places where occluded target objects, e.g., pedestrians and other animate objects of interest, can be located. An autonomous vehicle armed with such predictions can take appropriate defensive actions to reduce the risk of accidents caused by target objects emerging from their occlusions. Furthermore, the autonomous vehicle is capable of abstaining from taking an unnecessary action that would disrupt the traffic in situations where the likelihood of a presence of occluded target objects is low.

In those instances where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, fast and accurate detection and tracking of objects can be used to inform the driver of the approaching vehicles and/or other objects, with the driver making the ultimate driving decisions (e.g., in Level 2 systems), or to make certain driving decisions (e.g., in Level 3 systems), such as reducing speed, changing lanes, etc., without requesting driver's feedback.

FIG. 1 is a diagram illustrating components of an example autonomous vehicle (AV) 100 capable of deploying systems that predict presence of target objects in occluded areas of driving environments, in accordance with some implementations of the present disclosure. Autonomous vehicles can include motor vehicles (cars, trucks, buses, motorcycles, all-terrain vehicles, recreational vehicles, any specialized farming or construction vehicles, and the like), or any other self-propelled vehicles (e.g., robots, factory or warehouse robotic vehicles, sidewalk delivery robotic vehicles, etc.) capable of being operated in a self-driving mode (without a human input or with a reduced human input). "Objects," as referenced herein, can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things. "Target objects," as referenced herein can include any objects whose presence (or absence) in occluded areas is of relevance for charting a safe and effective driving path of the AV, including (but not limited to) vehicles, pedestrians, skateboard riders, scooter riders, riders of wheelchairs, animals (e.g., dogs), and/or other animate objects capable of moving towards or near a driving path of the AV.

A driving environment 101 can also include any objects (animate or inanimate) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. In such driving mode(s), even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate assessment of the driving environment can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more audio sensors 116, such as microphones, sonars, which can be ultrasonic sonars, and/or other audio sensors, in some implementations.

The sensing data obtained by the sensing system 110 can be processed by a data processing system 120 of AV 100. For example, the data processing system 120 can include a perception and planning system 130. The perception and planning system 130 can be configured to detect and track objects in the driving environment 101 and to classify (recognize) the detected objects, e.g., vehicles, pedestrians, animals, and/or the like. The perception and planning system 130 can also analyze images captured by the cameras 118 and can detect traffic light signals, road signs, roadway layouts (e.g., boundaries of traffic lanes, topologies of intersections, designations of parking places, and so on), presence of obstacles, and the like. The perception and planning system 130 can further receive radar sensing data (Doppler data and ToF data) to determine distances to various objects in the environment 101 and velocities (radial and, in some implementations, transverse, as described below) of such objects. In some implementations, the perception and planning system 130 can use radar data in combination with the data captured by the camera(s) 118, as described in more detail below.

Perception and planning system 130 can receive additional information from a positioning subsystem 122, which can include a GPS transceiver and/or inertial measurement unit (IMU), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by roadgraph information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Perception and planning system 130 can include an occluded object prediction (OOP) model 132 trained to determine the likelihoods that one or more target objects are present in occluded areas not exposed to a direct view of sensing system 110. For example, based on a determination made by perception and planning system 130 that a certain region is occluded by a stopped bus, a fire truck parked near a building with an activated fire alarm, a curbside delivery truck, and/or the like. OOP model 132 can use available roadgraph information 124 for the current driving scene and a driving scene context (e.g., locations, motion, and types of various objects in the scene) as an input to generate a map of probabilities p(x, y) that one or more target objects are located within the occluded area(s).

Perception and planning system 130 can further include a tracking and prediction component 134 to monitor how the driving environment 101 evolves with time, e.g., by determining and monitoring locations and velocities of various objects identified by OOP model 132 and other deployed computer vision models (not shown explicitly in FIG. 1 for brevity). In some implementations, tracking and prediction component 134 can keep track of the changing appearance of the environment due to motion of the AV relative to the environment. In some implementations, tracking and prediction component 134 can monitor how occluded areas evolve with time. For example, as the AV passes a stopped bus, sensing system 110 can obtain a view (of at least a portion) of the area previously occluded by the bus. Perception and planning system 130 can determine whether one or more target objects are present in the area and confirm or invalidate previous predictions of OOP model 132.

In some implementations, tracking and prediction component 134 can make predictions about how various tracked objects of the driving environment 101 will be positioned within a prediction time horizon. The predictions can be based on the current locations and velocities of the tracked objects as well as on the earlier locations and velocities (and, in some cases, accelerations) of the tracked objects. For example, based on stored data (referred as "track" herein) for object 1 indicating location/velocity of object 1 during the previous 3-second period tracking and prediction component 134 can conclude that object 1 is maintaining a constant speed. Accordingly, tracking and prediction component 134 can predict where object 1 is likely to be within the next 3 or 5 seconds of motion. As another example, based on track for object 2 indicating decelerated motion of object 2 approaching a road intersection over the previous 2-second period, tracking and prediction component 134 can conclude that object 2 is about to come to a stop sign before making a turn to a side road. Accordingly, tracking and prediction component 134 can predict where object 2 is likely to be within the next 1 or 3 seconds. The tracking and prediction component 134 can perform periodic checks of the accuracy of its predictions and modify the predictions based on new data obtained from the sensing system 110.

Perception and planning system 130 can further include a trajectory planning module 136 that uses predictions of OOP model 132 (and other deployed computer vision models) to chart a driving path. For example, trajectory planning module 136 can weigh the likelihood (predicted probability that a target object is in an occluded area) against a distance to the occluded area and determine whether to respond to the potential presence of the target object, e.g., by slowing down, moving to a different lane, and/or the like, or abstain from such a maneuver using one or more suitable decision-making metrics. For example, if a target object is predicted to be in an occluded area with a high probability, the maximum distance $L_{max}$ from the AV to the predicted target object, at which the vehicle is to modify its driving path, can be increased (with the vehicle modifying its driving path as long as $L<L_{max}$). Conversely, if the target object is predicted to be in the occluded area with a low probability, the maximum distance $L_{max}$ can be decreased (so that the vehicle does not react to distant target objects predicted with low probability).

Various systems and subsystems of data processing system 120 can have software stored in one or more system memory 126 devices. System memory 126 can include any volatile or non-volatile memory devices, such as read-only memory (ROM), random-access memory (RAM), electrically erasable programmable read-only memory (EEPROM), flash memory, flip-flop memory, or any other device capable of storing data. RAM can be a dynamic random-access memory (DRAM), synchronous DRAM (SDRAM), a static memory, such as static random-access memory (SRAM), and the like. In some implementations, system memory 126 can be an on-chip memory.

Operations of data processing system 120 can be performed by one or more processors 128, which can include CPU(s), GPU(s), field-programmable gate arrays (FPGAs), application-specific integrated circuits (ASICs), and the like.

"Processor" herein refers to a device capable of executing instructions encoding arithmetic, logical, or I/O operations, e.g., stored in system memory 126. In some implementations, processor(s) 128 and the system memory 126 can be implemented as a single controller, e.g., as a FPGA.

The data generated by the perception and planning system 130, including positional subsystem 122, OOP model 132, tracking and prediction component 134, trajectory planning module 136, and/or other systems and components can be used by an autonomous driving system, such as a vehicle control system (VCS) 140. The VCS 140 can include one or more algorithms that control how AV is to behave in various driving situations and environments. For example, the VCS 140 can include a navigation system for determining a global driving route to a destination point. The VCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The VCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of VCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the VCS 140 can be delivered directly to the powertrain, brakes, and steering 150 (or signaling 170) whereas other instructions output by the VCS 140 are first delivered to the vehicle electronics 160, which generates commands to the powertrain, brakes, and steering 150 and/or signaling 170.

In one example, OOP model 132 can determine, with 70% probability, that a pedestrian is present in an occluded area behind a stopped bus and that the distance from the occluded area is 4 meters from the driving path of the vehicle. Trajectory planning module 136 can then determine that the vehicle is to be slowed down to 15 mph and/or move to a different driving lane to ensure that the vehicle is capable of braking and coming to a full stop if the pedestrian is to emerge from the occluded area towards the driving path of the vehicle. The VCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver to steer away from the VRU. Subsequently, the VCS 140 can output instructions to the powertrain, brakes, and steering 150 to resume the previous speed settings of the vehicle. The vehicle can maintain the safe speed until the occluded area becomes visible to sensing system 110 (e.g., as the vehicle passes the stopped bus) and it is determined that the target object is not present in the area or until the area is safely behind the vehicle.

In some implementations, OOP model 132 can be trained using a teacher-student distillations framework, as disclosed in more detail below in conjunction with FIGS. 2-4.

Figure 2:
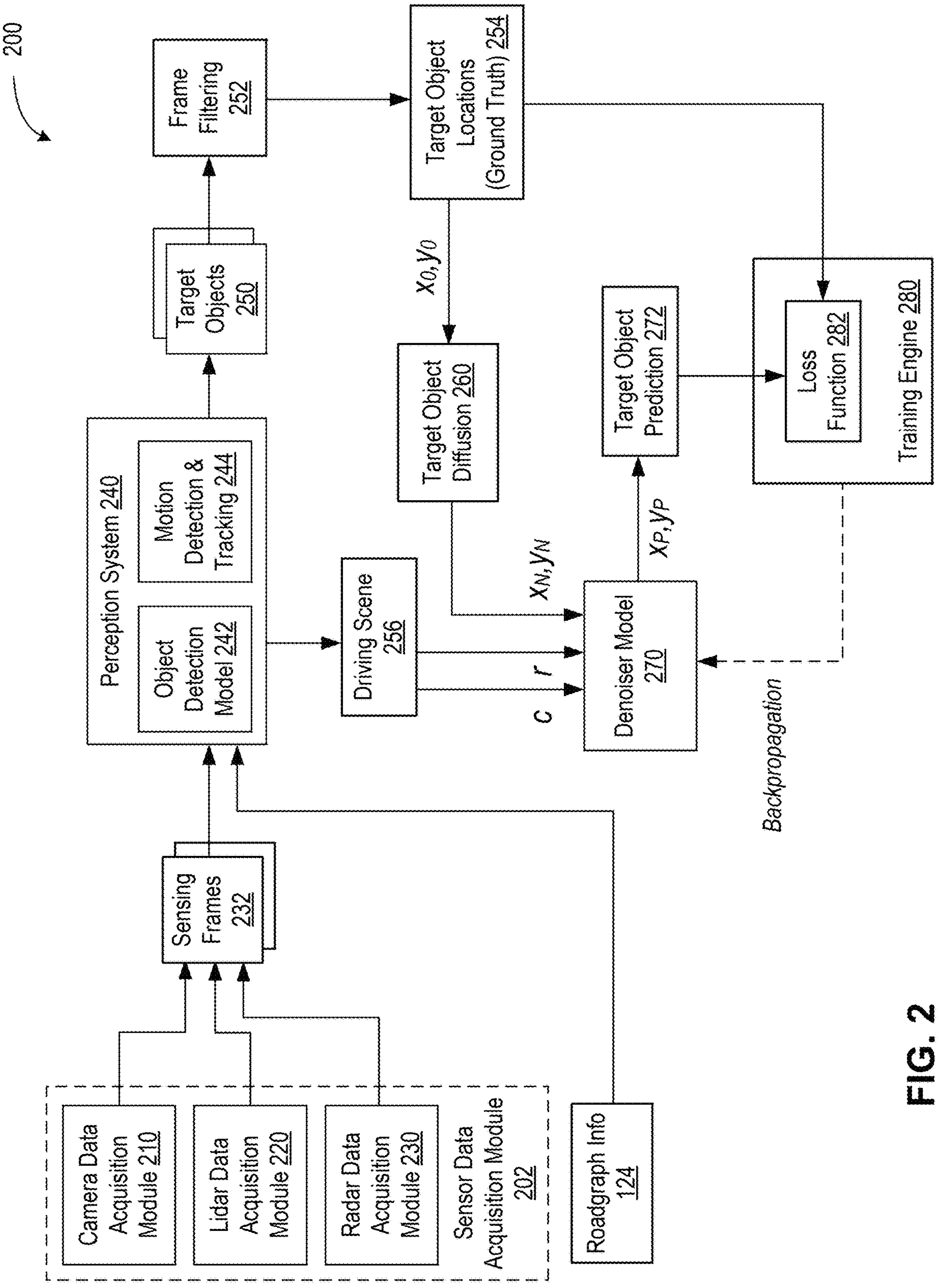
FIG. 2 is a diagram illustrating example training of a teacher model to identify locations of target objects in driving environments, in accordance with some implementations of the present disclosure.

FIG. 2 is a diagram illustrating example training 200 of a teacher model to identify locations of target objects in driving environments, in accordance with some implementations of the present disclosure. As illustrated, training 200 can involve using sensing data obtained by a sensing system of an autonomous vehicle (e.g., sensing system 110 of FIG. 1) during live driving missions (autonomous and/or driver-operated). Some of the operations illustrated in FIG. 2 can be performed during such driving missions, e.g., collection and initial processing of sensing data (including object detection, tracking, creating and storing logs), while other operations, e.g., data filtering, processing the data by the teacher model, and training parameters of the teacher model, can be performed offline. Data used in training 200 of the teacher model can have multiple sensing modalities, including but not limited to data collected by a sensor data acquisition module 202 receiving data obtained by lidar 112, radar 114, camera(s) 118 (with reference to FIG. 1), and/or audio 116. Sensor data acquisition module 202 can include a camera data acquisition module 210, a lidar data acquisition module 220, and/or radar data acquisition module 230. More specifically, camera data acquisition module 210 can acquire a sequence of camera images, e.g., two-dimensional projections of the driving environment (or a portion thereof) on an array of sensing detectors (e.g., charged coupled device or CCD detectors, complementary metal-oxide-semiconductor or CMOS detectors, and/or the like). Each camera image can have pixels of various intensities of one color (for black-and-white images) or multiple colors (for color images). The camera images can be panoramic images or images depicting a specific portion of the driving environment. The camera images can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images can be preprocessed, e.g., downscaled (with multiple pixel intensity values combined into a single pixel value), upsampled, filtered, denoised, and the like. Camera image(s) can be in any suitable digital format (JPEG, TIFF, GIG, BMP, CGM, SVG, and so on).

A lidar data acquisition module 220 (and, similarly, radar data acquisition module 230) can provide lidar (radar) images, which can include a set of return points (point cloud) corresponding to laser (radar) beam reflections from various objects in the driving environment. Each return point can be understood as a data unit (pixel) that includes coordinates of reflecting surfaces, radial velocity data, intensity data, and/or the like. For example, lidar data acquisition module 220 (radar data acquisition module 230) can provide the images that includes the intensity map I(R, θ, ϕ), where R, θ, ϕ is a set of spherical coordinates. In some implementations, Cartesian coordinates, elliptic coordinates, parabolic coordinates, or any other suitable coordinates can be used instead. The intensity map identifies an intensity of the lidar (radar) reflections for various points in the field of view. The coordinates of objects (or surfaces of the objects) that reflect lidar (radar) signals can be determined from directional data (e.g., polar θ and azimuthal ϕ angles in the direction of lidar transmissions) and distance data (e.g., radial distance R determined from the time of flight of lidar signals). The lidar and/or radar images can further include velocity data of various reflecting objects identified based on detected Doppler shift of the reflected signals. Although FIG. 2 illustrates an implementation in which three data acquisition modules are deployed, one or more data acquisition modules can be absent (or disabled) in some implementations. For example, the camera data acquisition module 210 and the lidar (or radar) data acquisition module 220 can be deployed while the radar data acquisition module 230 (or lidar data acquisition module 220) is not deployed.

The camera images, lidar images, and/or radar images can be large images of the entire driving environment or images of a significant portion of the driving environment (e.g., camera image acquired by a forward-facing camera(s) of the vehicle's sensing system). The acquired camera, lidar, and/or radar images can be combined into sensing frames 232, different frames associated with different times of acquisition, e.g., as can be represented via timestamps. In some implementations, different sensors can acquire images at different rates, e.g., lidar images can be acquired at the rate of 50 Hz, camera images can be acquired at the rate of 24 Hz, radar images can be acquired at the rate of 10 Hz, and/or the like. Accordingly, in some implementations, combined sensing frames 232 can have the lowest rate (e.g., 10 Hz) with the higher-rate sensing data aggregated across multiple frames (e.g., with 5 lidar images aggregated and combined with one radar image). In some implementations, sensing frames 232 can have the highest rate (e.g., 50 Hz) with the lower-rate sensing data used across multiple sensing frames (e.g., with one radar image combined with 5 consecutive lidar sensing frames).

Sensing frames 232 can be processed by perception system 240 (which can be a part of perception and planning system 130 in FIG. 1). Perception system 240 can include an object detection model 242, which can be a computer vision model (or a set of multiple models) trained to identify individual objects in the sensing frames 232, e.g., vehicles, pedestrians, animals, road signs, buildings, structures, overpasses, and/or the like. Object detection model 242 can output bounding boxes or any other bounding shapes (e.g., convex hulls) that enclose or otherwise indicate locations of various objects in the environment. Object detection model 242 can further output types (labels) of the objects, e.g., "pedestrian," "vehicle," "traffic light," "road sign", and/or the like. Perception system 240 can also receive roadgraph information 124, which can include static (e.g., map) data for various drivable surfaces, such as roads, streets, lanes, driveways, and/or the like. In some implementations, perception system 240 can use object detection model 242 (or other computer vision models) to detect the observed difference between the current driving environment and the static map data and update roadgraph information 124 accordingly. For example, a lane detection model can detect recent or transient changes to the driving environment (e.g., lane closures, shifts, etc., caused by construction, traffic incidents, and/or the like) that are not captured by the static map and can update the map using contemporaneously sensed data. Roadgraph information 124 can include a map of polylines corresponding to various driving lanes, lane turns/splits/merges/starts/ends, and/or the like.

Objects identified by object detection model 242 can be tracked by motion detection and tracking 244, which can maintain and update various geo-motion data related to the motion of the objects between different timestamp $t_j$, e.g., $\vec{R}(t_j)$, velocity $\vec{V}(t_j)$, acceleration $\vec{a}(t_j)$, angular velocity $\vec{\omega}(t_j)$, and/or the like. In some implementations, tracking and prediction component 134 can deploy a suitable statistical filter, e.g., Kalman filter. Kalman filter can compute: (i) a most probable geo-motion data in view of the measurements obtained (e.g., of visible locations, Doppler velocity, and/or the like), (ii) predictions made according to a physical model of object's motion, and (ii) statistical assumptions about measurement errors (e.g., covariance matrix of errors). Based on this collected data, tracking and prediction component 134 can estimate, for a certain time horizon (e.g., one or several second), an accurate future motion of the object.

Processing by perception system 240 can be performed on board a vehicle during live driving missions. The outputs of perception system 240 can include perception logs with locations of detected objects, types of objects, motion (tracks) of the objects, and/or the like. The perception logs can further include the (updated from live sensor data) roadgraph information. Locations and motion data for the objects, taken in conjunction with the roadgraph information, constitutes a dynamic (frame-dependent) representation of the driving environment, including places where the objects are positioned within the environment (e.g., on sidewalks, roadway, specific lanes of roadway, and/or the like) and what type of motion these objects perform.

Further processing and use of collected perception logs can be performed offline. Various target objects 250 can be identified within the perception logs. For example, target objects 250 can include pedestrians (but can also include objects of other kinds, as described above). Perception logs can undergo frame filtering 252 that eliminate sensing frames that do not depict target objects 250. Target object locations 254 in the remaining sensing frames can be used as ground truth in training of a denoiser model 270 (to be used as a teacher model, as disclosed in conjunction with FIG. 3).

In some implementations, training inputs into denoiser model 270 can be generated by selecting a particular driving scene 256 (e.g., corresponding to one or more sensing frames) that includes one or more target objects. The driving scene 256 can be represented by the roadgraph r (e.g., determined using a combination of a static map and live sensing data) for one or more sensing frames 232 and context c, which can include locations and motions of various objects (including target objects and all other objects detected for the frame) in the sensing frame(s) 232. Next, locations of one or more target objects within the driving scene 256 can be masked using a target object diffusion 260.

Figure 3:
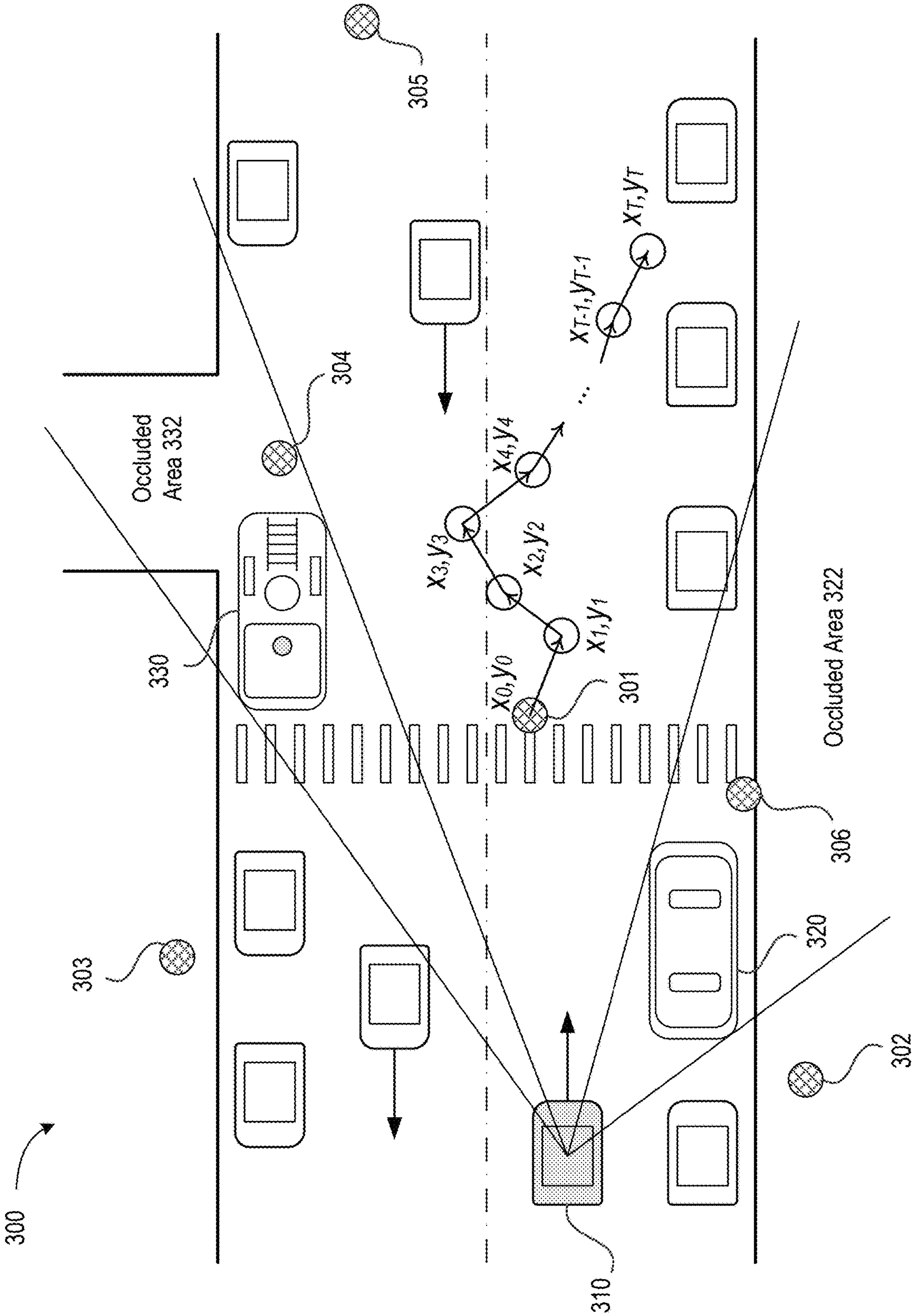
FIG. 3 illustrates one example driving scene that can be used as a training input to train the teacher model of FIG. 2 to identify locations of target objects in driving environments, in accordance with some implementations of the present disclosure.

FIG. 3 illustrates one example driving scene 300 that can be used as a training input to train the teacher model of FIG. 2 to identify locations of target objects in driving environments, in accordance with some implementations of the present disclosure. Driving scene 300 includes an autonomous vehicle 310 driving along a portion of a city street that also includes one or more target objects, e.g., pedestrians 301-306. Driving scene 300 includes a bus 320 and a fire truck 330 that occlude respective occluded areas 322 and 332 from a sensing system of autonomous vehicle 310.

To generate a training input into denoiser model 270, target object diffusion 260 can mask locations of one or more pedestrians 301-306 in driving scene 300, e.g., by adding noise to the objects' actual locations. For example, as illustrated for pedestrian 301 in FIG. 3, the actual coordinates of the pedestrian can be shifted $x_0$, $y_0 \rightarrow x_1$, $y_1$, by adding a random shift (noise) $\Delta x_1, \Delta y_1$ to the location of pedestrian 301: $x_1 = x_0 + \Delta x_1$, $y_1 = y_0 + \Delta y_1$. The shift $\Delta x_1$, $\Delta y_1$ can be selected (sampled) from a suitable reference distribution, e.g., a normal (Gaussian) distribution with a suitably selected variance (width of the distribution). This process can be repeated for additional sampled shifts, $x_t$, $y_t \rightarrow x_{t+1} \rightarrow y_{t+1}$, e.g., for the total of T shifts, until the final locations of the object $x_T$, $y_T$ are randomized over various (e.g., all possible) locations in the driving episode; T can be a training hyperparameter (e.g., T=4, 6, 10, 12, 50, 100, or any other empirically set number). The locations can be constrained to places that are not occupied by other objects, e.g., with sampled shifts rejected if they bring pedestrian 301 to a place already occupied by another object.

With a continued reference to FIG. 2, denoiser model 270 can be trained to perform a denoising process and reverse the random steps starting from the final location, $x_T$, $y_T \rightarrow x_{T-1}$, $y_{T-1} \rightarrow \ldots \rightarrow x_1$, $y_1 \rightarrow x_0$, $y_0$, to target object (ground truth) location 254 of the object, $x_0$, $y_0$, given the current context c and roadgraph information r, which are used as additional inputs into the denoiser model 270.

Accordingly, denoiser model 270, parameterized with a set of learnable parameters θ (e.g., neural weights and biases), learns to recover correct target object location $x_0$, $y_0$ given (random) initial location $x_T$, $y_T$ (the final locations of target object diffusion 260) and context c and roadgraph information r, via a series of reverse-diffusion steps:

$$p_\theta(x_P, y_P \mid x_T, y_T; c, r) = p_\theta(x_0, y_0 \mid x_1, y_1; c, r) \cdot p_\theta(x_1, y_1 \mid x_2, y_2; c, r) \cdot \ldots \cdot p_\theta(x_{T-1}, y_{T-1} \mid x_T, y_T; c, r) \cdot p_\theta(x_{T-1}, y_{T-1} \mid x_T, y_T; c, r).$$

The steps in this example correspond to a Markovian process with probabilities of successive steps being independent of other steps so that the total probability is determined by a product of individual probabilities.

In some implementations, non-Markovian processes can be used, e.g. with distributions of consecutive diffusion steps depending more than on the last object location, e.g., on the last N locations. In one non-limiting example of N=2, the distributions in the last equation can be replaced according to $p_\theta(x_0, y_0 | x_1, y_1; c, r) \rightarrow p_\theta(x_0, y_0 | x_1, y_1; x_2, y_2; c, r)$, and similarly in other distributions. In other implementations, different values of N can be used, e.g., N=3, etc.

Training of denoiser model 270 can include changing the model's parameters θ in a way that brings the generated distributions $p_\theta(x_P, y_P | x_T, y_T; c, r)$ of target object predictions 272 closer to the ground truth locations of target objects. A suitable loss function 282 executed by a training engine 280 can evaluate the difference between predicted locations $x_P$, $y_P$ and the ground truth locations $x_0$, $y_0$. In some implementations, loss function 282 can be a mean squared error loss function, $L = (x_P - x_0)^2 + (y_P - y_0)^2$. Model parameters θ can be modified to minimize the loss L, e.g., using various techniques of graduate descent and backpropagation.

Training engine 280 can be executed by a suitable server that deploys one or more processing devices, e.g., central processing units (CPUs), graphics processing units (GPUs), and/or the like. Training engine 280 can train denoiser model 270 using multiple training inputs that are similar to the example driving scene 300. During training, denoiser model learns to make accurate predictions about where the target objects are likely to be within a training driving scene given the scene's context c and roadgraph information r. In particular, denoiser model 270 can learn that a pedestrian (e.g., pedestrian 301 in FIG. 3) is more likely to be present on a sidewalk or a street crossing than in the middle of a roadway, in one example.

Figure 4:
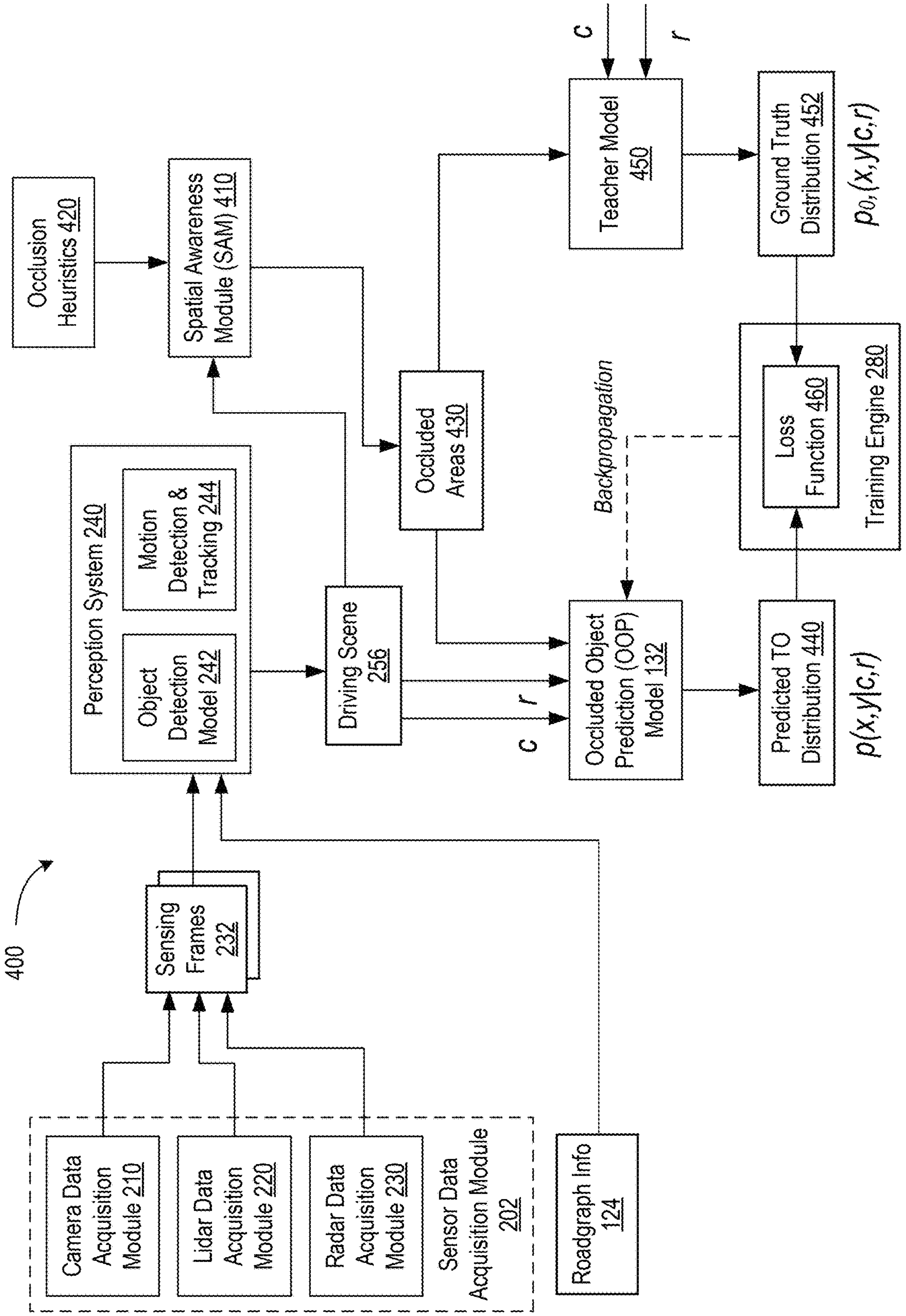
FIG. 4 is a diagram illustrating an example training of a student model to predict a likelihood of presence of target objects in occluded areas of driving environments, in accordance with some implementations of the present disclosure.

FIG. 4 is a diagram illustrating an example training 400 of a student model to predict a likelihood of presence of target objects in occluded areas of driving environments, in accordance with some implementations of the present disclosure. Training 400 can be used to train occluded object prediction (OOP) model 132 (student model) using outputs of a teacher model 450 as a ground truth. In some implementations, teacher model 450 can be (or include) denoiser model 270 disclosed in conjunction with FIGS. 2-3. Like training 200 of a teacher model, training 400 can be performed offline using sensing data obtained during live driving missions. In some implementations, training 400 can be performed using synthetic driving scenes, e.g., scenes generated by a computing simulation software that simulates or uses real street and/or highway roadgraph (layout) data to set up a driving scene and that further places various synthetic objects (vehicles, pedestrians, etc.) within the driving scene. In those instances where training inputs are generated using real sensing data, a driving scene data can be obtained in a way that is similar to how training data is obtained for training a teacher model (as disclosed in conjunction with FIG. 2). More specifically, sensing frames 232 can be received (and aggregated) from one or more of camera data acquisition module 210, lidar data acquisition module 220, radar data acquisition module 230, and/or the like. Sensing frames 232 can be processed by perception system 240, which can include an object detection model 242 to output locations and types of individual objects in the sensing frames 232, e.g., vehicles, pedestrians, animals, road signs, buildings, structures, overpasses, and/or the like. Motion detection and tracking 244 can maintain and update tracks of various detected objects, including objects' heading, speed, lane of travel, acceleration or deceleration, and/or the like. Perception system 240 can further receive roadgraph information 124, e.g., a static map of drivable surfaces (roads, streets, lanes, overpasses, driveways, etc.) modeled with polylines or in any other suitable manner. Perception system 240 can use object detection model 242 and/or any other computer vision model(s) to update roadgraph information 124 based on live sensing data.

Perception system 240 can generate perception logs that can be used for offline training of OOP 132. Perception logs can encode a particular driving scene 256 including identification of roadgraph information r (determined using static roadgraph information 124 and/or live sensing data) and by context c, which can include locations and motions of various objects. Additionally, a spatial awareness module (SAM) 410 can process driving scene data to identify occluded areas 430 in the driving scene 256 that are not visible from the vantage point of the vehicle's sensing system, e.g., regions occluded by one or more vehicles, buildings, structures, and/or the like. For example, upon processing of driving scene 300 of FIG. 3, SAM 410 simulate sensing rays extended from or to the vehicle (e.g., as depicted in FIG. 3) to identify occluded areas (e.g., areas 322 and 332 in FIG. 3) that are not within the direct view of the sensing system and can potentially hide target objects. Processing by OOP model 132 can then be focused on such occluded areas 430.

In some implementations, SAM 410 can additionally use one or more occlusion heuristics 420 to further limit selection of occluded areas 430. For example, occlusion heuristics 420 can specify that areas behind objects of a certain minimum height, e.g., buses, trucks, trees, etc., are to be included in occluded areas 430. In some implementations, occluded heuristics 420 can specify that objects below a certain height, e.g., passenger cars, are not to be selected into occluded areas 430 unless some additional conditions are present, e.g., a car has one or more open doors or is idling, etc. Various other occlusion heuristics 420 can be defined. In some implementations, occlusion heuristics 420 are not used. Instead, determination of occluded areas 430 can be performed by extending rays from/to the location(s) of sensors of the autonomous vehicle and identifying interception points of the extended rays with various objects in the driving scene 256. Provided that the interception points are closer than a certain empirically set distance, e.g., 10 m, 12 m, and/or the like, regions behind the interception points can be selected into occluded areas 430 that are to be processed by OOP model 132.

OOP model 132 can process driving scene 256 (including roadgraph r and context c) and predict probabilities that a target object is located at various points within the one of the occluded areas 430. OOP model 132 can be, or include, a convolutional neural network or a combination of a convolutional and a deconvolutional network (e.g., a network having a U-net architecture). In some implementations, OOP model 132 can have some other suitable network architectures, e.g., fully connected network, a neural network with attention (self-attention and/or cross-attention), a transformer network, and/or the like or some combination of multiple networks.

Output of OOP model 132 can include a predicted target object distribution 440, e.g., probabilities p(x, y|c, r) that a target object is located at various points x, y in one of the occluded areas 430. The probabilities p(x, y|c, r) are conditional on context c and roadgraph r (e.g., received by an input neuron layer of OOP model 132).

Additionally, training 400 can use a ground truth distribution 452, e.g., probabilities $p_0$(x, y|c, r) generated by teacher model 450 for the same occluded areas 430 of the driving scene 256. In some implementations, teacher model 450 can be (or include) denoiser model 270 of FIG. 2. The ground truth distribution 452 can be obtained from a set of learned parameters θ of the denoiser model 270. For example, the log-probability log $p_t$(x, y|c, r) in the diffusion process can satisfy the diffusion flow equation, $$\frac{\partial \log p_t(x, y \mid c, r)}{\partial t} = -\nabla \cdot \vec{f}_t(x, y \mid c, r),$$

where t enumerates steps in the forward diffusion process described in conjunction with FIG. 2, and $\vec{f}=(f_x, f_y)$ the vector flux function that is proportional to the gradient of the log-probability, $$\vec{f}_t(c, r) = -D\nabla \log p_t(x, y \mid c, r),$$

with D being a diffusion parameter characterizing a degree of noise—the variance of the distribution used to select shifts Δx, Δy in the diffusion process. The gradient $\nabla\cdot\vec{f}_t$(x, y|c, r) is learned as part of the reverse diffusion process and is expressed via parameters θ of the denoiser model 270: $\nabla\cdot\vec{f}_t(c, r)=F_t(c, r; \theta)$. The log-probability can then be determined by integrating the diffusion flow condition between t=0 and t=T:

$$\log p_0(c, r) = \log p_T(c, r) + \int_0^T dt F_t(c, r; \theta),$$

where log $p_0$(c, r) is the ground truth distribution 452 and log $p_T$(c, r) is a reference distribution (e.g., Gaussian distribution) achieved after (a large number of) T steps of the diffusion process.

Training of OOP model 132 can include changing parameters (e.g., neural weights and biases) of OOP model 132 in a direction that brings the probabilities p(x, y|c, r) of the predicted target object distribution 440 closer to the probabilities $p_0$(x, y|c, r) of the ground truth distribution 452. Training engine 280 can use a suitable loss function 460 to evaluate the difference between the two distributions. Parameters of OOP model 132 can be modified to minimize the loss function 460, e.g., using various techniques of graduate descent and backpropagation. Loss function 460 can include a sigmoid cross-entropy loss function, a binary cross-entropy loss function, a Kullback-Leibler loss function, a mean squared error loss function, and/or some other suitable function.

Figure 5:
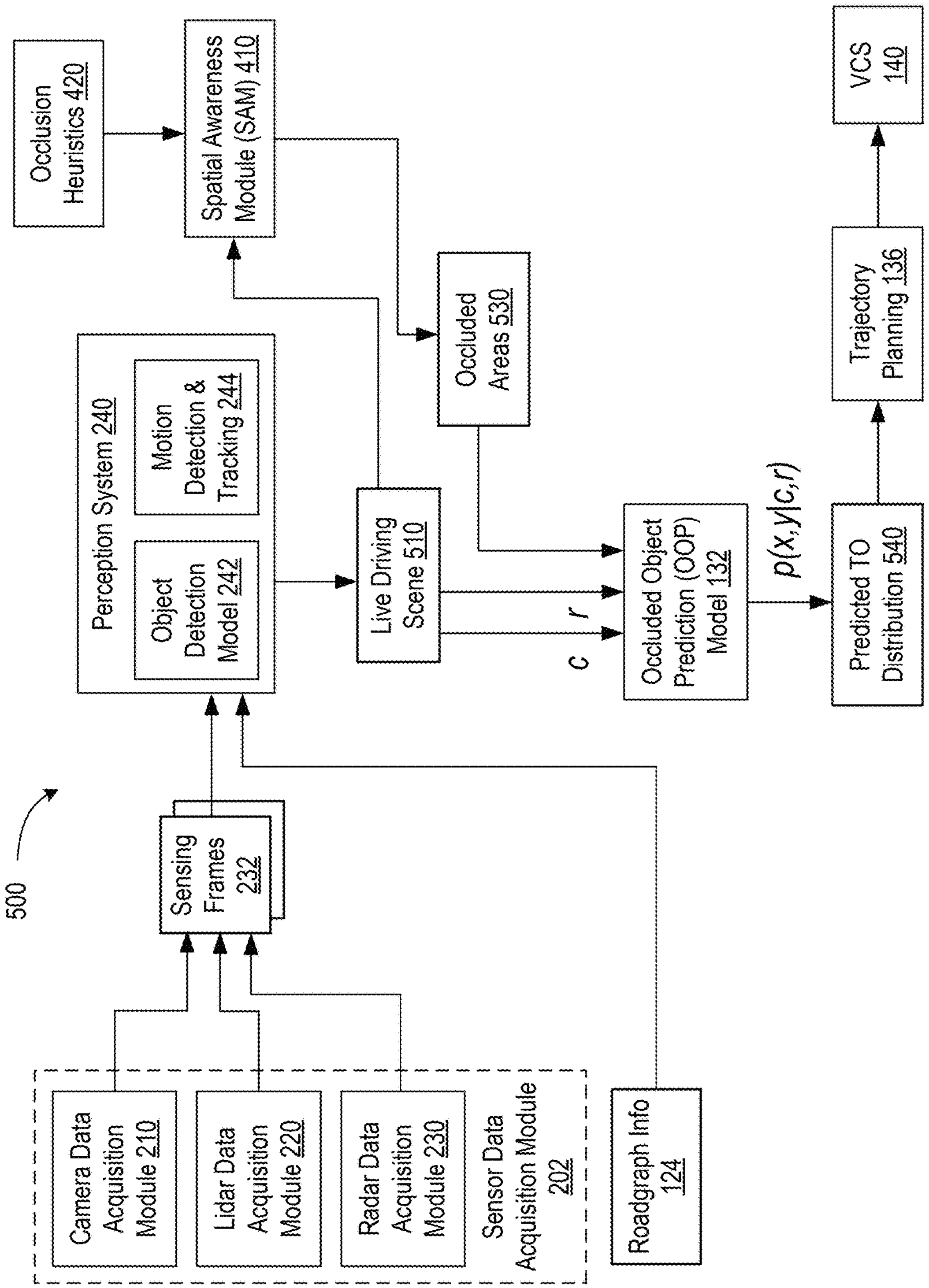
FIG. 5 is a diagram illustrating example inference operations that deploy a trained occluded object prediction model to predict likelihoods of presence of target objects in occluded areas of driving environments, in accordance with some implementations of the present disclosure.

FIG. 5 is a diagram illustrating example inference operations 500 that deploy a trained occluded object prediction model to predict likelihoods of presence of target objects in occluded areas of driving environments, in accordance with some implementations of the present disclosure. Inference operations 500 can be performed by an on-board perception and planning system of an autonomous vehicle, e.g., perception and planning system 130 of FIG. 1. In some implementations, inference operations 500 can include processing of live sensing data using trained OOP 132. Such processing can be performed similarly to the processing of data performed as part of training 400 of OOP model 132, as disclosed in conjunction with FIG. 5.

More specifically, sensing frames 232 can be received from one or more of camera data acquisition module 210, lidar data acquisition module 220, radar data acquisition module 230, and/or the like. Sensing frames 232 can be processed by perception system 240 that uses an object detection model 242 to output locations and/or types of individual objects in the sensing frames 232 with motion detection and tracking 244 optionally maintaining/updating motion tracks of detected objects. Perception system 240 can also receive and update, using live sensing data, roadgraph information 124, including traffic light status, temporarily closed/shifted/blocked/etc. lanes, recent/changed traffic signs, and/or the like. Perception system 240 can generate perception logs that include context c, e.g., locations and motion of various objects in a live (current) driving scene 510 and roadgraph information r, e.g., a representation of drivable surfaces in the live driving scene 510. In some implementations, SAM 410 can use occlusion heuristics 420 to identify occluded areas 530 in the live driving scene 510 (e.g., as described in conjunction with FIG. 4).

OOP model 132 can process context c and roadgraph r associated with the driving scene 256 and predict probabilities that one or more target objects are located at various points in the occluded areas 530. Output of OOP model 132 can include a predicted target object distribution 540 of conditional (depending on c and r) probabilities p(x, y|c, r) indicating a likelihood that target object(s) can be present at various points x, y in the occluded areas 530.

In some implementations, trajectory planning module 136 can determine, based on the predicted probabilities p(x, y|c, r), whether the autonomous vehicle is to continue a previously selected trajectory or modify that trajectory. In some implementations, trajectory planning module 136 can identify regions where predicted probabilities p(x, y|c, r) exceed an empirically set threshold probability q: p(c, r)>q (or p(c, r)≥q), as potential regions where a target object is likely to be located. Trajectory planning module 136 can then determine whether the identified target object locations are within a distance that is less than a safe distance for the autonomous vehicle's response. In some implementations, the threshold probability can be distance-dependent, q(L), which can be an increasing function of distance L from the vehicle to the location of a predicted occluded target object. For example, for a certain distance $L_1$ (e.g., 2-3 meters), the vehicle can modify its trajectory already if the probability that an occluded target object has a low probability of presence, $p>q_1$, e.g., $q_1=0.2$, 0.3%, etc. (although, in other implementations, $q_1$ can be smaller, e.g., 0.02-0.03% or larger (e.g., 2-3%), etc.) At increased distance $L_2$ (e.g., 5-6 meters), the vehicle can modify its trajectory if the probability that an occluded target object has a higher probability of presence, $p>q_2$, e.g., $q_2=0.6\%$, 0.7%, and/or the like (although, in other implementations, $q_1$ can be smaller, e.g., 0.06-0.07% or larger (e.g., 6-7%), etc.). The numerical values should be considered as illustrations as actual numbers can be set based on many practical factors.

A specific threshold dependence q(L) can be determined empirically and can be different for different driving environments (e.g., urban, highway, rural, etc.), different types of driving surfaces (e.g., pavement, gravel, off-road, etc.), different kinds of autonomous vehicles (e.g., car, truck, etc.), different weather conditions (dry, rain, snow/ice, etc.), and/or the like. The set of such {q(L)} dependences can be determined based on testing and stored in memory accessible to trajectory planning module 136.

Figure 6:
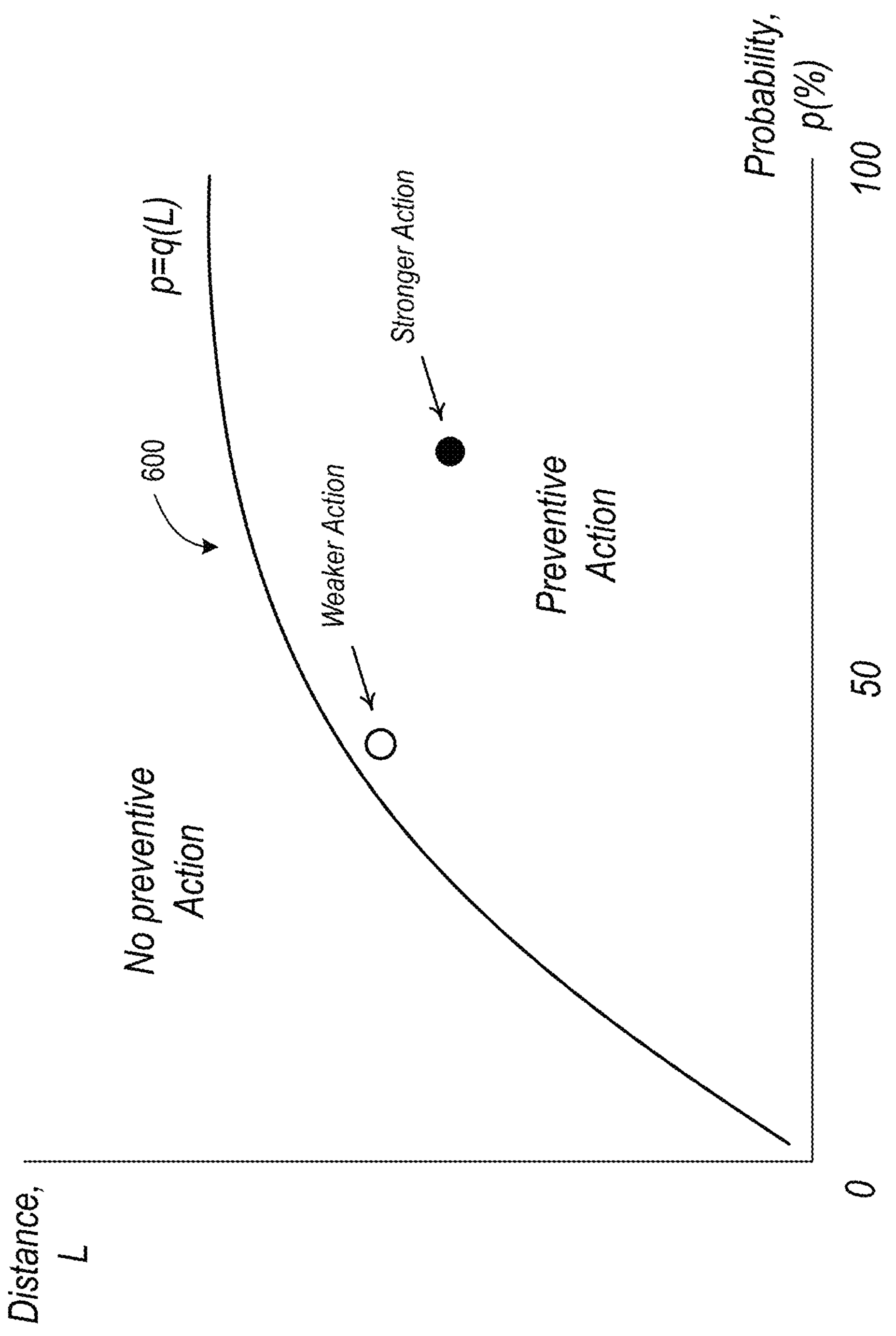
FIG. 6 illustrates schematically a decision-making process used for trajectory planning by an autonomous vehicle, in accordance with some implementations of the present disclosure.

In some implementations, dependence q(L) can be considered a separatrix (boundary) that separates a region in the likelihood-distance q-L space where trajectory planning module 136 takes no preventive (avoidance) action from a region where trajectory planning module 136 determines that a preventive action is to be taken. FIG. 6 illustrates schematically a decision-making process used for trajectory planning by an autonomous vehicle, in accordance with some implementations of the present disclosure. FIG. 6 illustrates the likelihood-distance space q-L with a separatrix line 600, p=q(L). Above the separatrix 600 is a region of large distances/low probabilities where no preventive action is taken. Similarly, below the separatrix 600 is a region of low distances/large probabilities where preventive action is taken. In some implementations, the response can be a continuous function of the distance to the threshold.

Once trajectory planning module 136 has determined that a preventive action is to be taken, VCS 140 can perform one or more maneuvers to reduce a chance of a contact with the target object if the target object emerges from the occluded area towards the path of the vehicle. Such maneuvers can include slowing the vehicle down, causing the vehicle to change lanes, or otherwise moving away from the likely location(s) of the target object object(s), and/or some combination of such actions. In some implementations, a specific response, e.g., a degree of slowdown or nudging of the vehicle can depend on how deep a point in the likelihood-distance space in FIG. 6 is located. For example, a white circle in FIG. 6 indicates a prediction event (in the likelihood-distance space) that is close to the separatrix 600. Correspondingly, a weaker action can be taken, e.g., slowing the vehicle by a moderate degree while keeping the vehicle in the same driving lane. As another example, a black circle in FIG. 6 indicates a prediction event that is farther away from the separatrix 600. Correspondingly, a stronger action can be taken, e.g., slowing the vehicle more substantially, moving the vehicle to an adjacent lane (if unoccupied), and/or the like.

Figure 7:
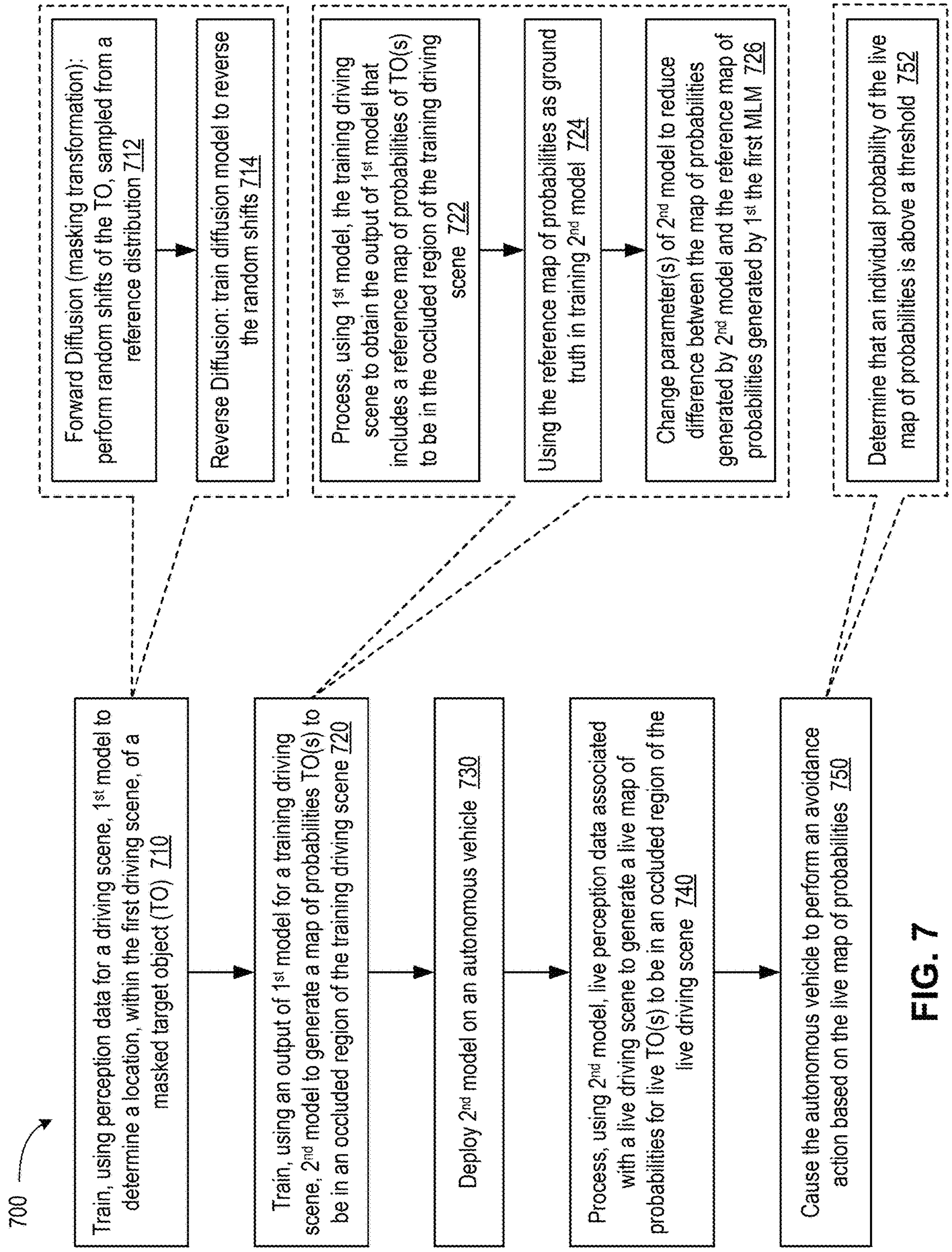
FIG. 7 illustrates an example method of training and deploying machine learning models to predict likelihoods of presence of target objects in occluded areas of driving environments, in accordance with some implementations of the present disclosure.

FIG. 7 illustrates an example method 700 of training and deploying machine learning models to predict likelihoods of presence of target objects in occluded areas of driving environments, in accordance with some implementations of the present disclosure. A processing device, having one or more processing units (CPUs), one or more graphics processing units (GPUs), one or more parallel processing units (PPUs) and memory devices communicatively coupled to the CPU(s), GPU(s), and/or PPU(s) can perform method 700 and/or each of its individual functions, routines, subroutines, or operations. Method 700 can be directed to systems and components of a vehicle. In some implementations, the vehicle can be an autonomous vehicle. In some implementations, the vehicle can be a driver-operated vehicle equipped with driver-assistance systems, e.g., Level 2 or Level 3 driver assistance systems, that provide limited assistance with specific vehicle functions (e.g., steering, braking, acceleration, etc. systems) or under limited driving conditions (e.g., highway driving). Method 700 can be executed by a suitable processing device or multiple processing devices. In certain implementations, a single processing thread can perform method 700. Alternatively, two or more processing threads can perform method 700, each thread executing one or more individual functions, routines, subroutines, or operations of the method. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. Some operations of method 700 can be performed in a different order compared with the order shown in FIG. 7. Some operations of method 700 can be performed concurrently with other operations. Some operations can be optional.

At block 710, method 700 can include training, using perception data associated with a first driving scene, a first machine learning model (MLM) to determine a location, within the first driving scene, of a target object masked with a masking transformation. Target objects can include vehicles, pedestrians, and/or other animate objects, such as wheelchair riders, scooter riders, animals, and/or the like. (Operations of method 700 can be performed to determine locations of any number of such target objects.) In some implementations, the perception data associated with the first driving scene can include context data and roadgraph data. The context data can include locations and types of objects in the first driving scene (e.g., any suitable set of bounding shapes, classification labels, and/or the like). The roadgraph data can represent one or more drivable lanes in the first driving scene (e.g., using any suitable lines, polylines, waypoints, nodes, and/or the like) and status of those lanes, e.g., as can be determined by traffic lights, traffic signs, cones, flares, plastic and/or concrete blocks, etc. In some implementations, block 710 includes operations illustrated in the top callout portion of FIG. 7. More specifically, at block 712, performance of the masking transformation can include a plurality of random shifts of the target object sampled from a reference distribution (such as a normal or Gaussian distribution, uniform distribution, uniform distribution within a defined range, etc.) of shifts, e.g., via addition of a Gaussian or other suitable noise. In some implementations, the first MLM includes a diffusion model (e.g., denoiser model 270 in FIG. 2). At block 714, method 700 can include reversing, using the diffusion model, the plurality of random shifts.

At block 720, method 700 can include training, using an output of the first MLM for a training driving scene, a second MLM (e.g., OOP model of FIG. 5) to generate a map of probabilities (e.g., predicted target object distribution 440, p(x, y|c, r) in FIG. 4) of one or more target objects to be in an occluded region of the training driving scene. In some implementations, training of the second MLM can be performed using training driving scene(s) that are the same as driving scenes used in training of the first MLM. In some implementations, training of the second MLM can be performed using training driving scene(s) that are different from driving scenes used in training of the first MLM.

In some implementations, training the second MLM includes operations illustrated in the middle callout portion of FIG. 7. More specifically, at block 722, method 700 can include processing, using the first MLM, the training driving scene to obtain the output of the first MLM that includes a reference map of probabilities (e.g., probabilities $p_0$(x, y|c, r) in FIG. 4) of the one or more target objects to be in the occluded region of the training driving scene. At block 724, method 700 can include using the reference map of probabilities as ground truth (e.g., ground truth distribution 452) in training of the second MLM. At block 726, method 700 can include changing one or more parameters of the second MLM to reduce a loss value (e.g., computed using loss function 460) characterizing a difference between the map of probabilities generated by the second MLM and the reference map of probabilities generated by the first MLM.

At block 730, method 700 can include causing the second MLM to be deployed on an autonomous vehicle.

At block 740, method 700 can include processing, using the second MLM, live perception data associated with a live driving scene to generate a live map of probabilities (e.g., predicted target object distribution 540 in FIG. 5) for one or more live target objects to be in an occluded region of the live driving scene.

At block 750, method 700 can include causing the autonomous vehicle to perform an avoidance action based on the live map of probabilities. In some implementations, causing the autonomous vehicle to perform the avoidance action includes operations illustrated in the bottom callout portion of FIG. 7. More specifically, at block 752, method 700 can include determining that an individual probability of the live map of probabilities is above a threshold probability (e.g., as illustrated in conjunction with FIG. 6). In some implementations, the threshold probability depends on a distance between the autonomous vehicle and a location associated with the individual probability, a type of the autonomous vehicle (e.g., car, truck, etc.), a condition of a driving surface of the live driving scene (e.g., wet, dry, icy, etc.), and/or a combination thereof.

In some implementations, method 700 can be executed by a computing system of a fleet of autonomous vehicles. In one example non-limiting implementation, the computing system of the fleet can include one or more servers, including a training server. Each server can include one or more memory devices and one or more processing devices communicatively coupled to one or more memory devices. The computing system of the fleet can further include individual computing devices deployed on board individual autonomous vehicles of the fleet. Each individual on-board computing device can include its own memory device (or multiple memory devices) and a processing device (or multiple processing devices) communicatively coupled to the corresponding memory device(s). In one illustrative example, operations of training blocks 710, 712, 714, 720, 722, and 724 (as well as block 730) can be performed by a first processing device, such as a processing device of the training server, e.g., responsive to instructions issued by training engine 280 of FIGS. 2 and 4. Operations of inference blocks 740, 750, and 752 of method 700 can be performed by a second processing device, such as processor 128 of FIG. 1, e.g., responsive to instructions of perception and planning system 130 of FIG. 1. Any, some or all operations of method 700 can be performed responsive to instructions stored in non-transient computer-readable memory, e.g., system memory of the training server and/or system memory 126 of autonomous vehicle 100 of FIG. 1.

Figure 8:
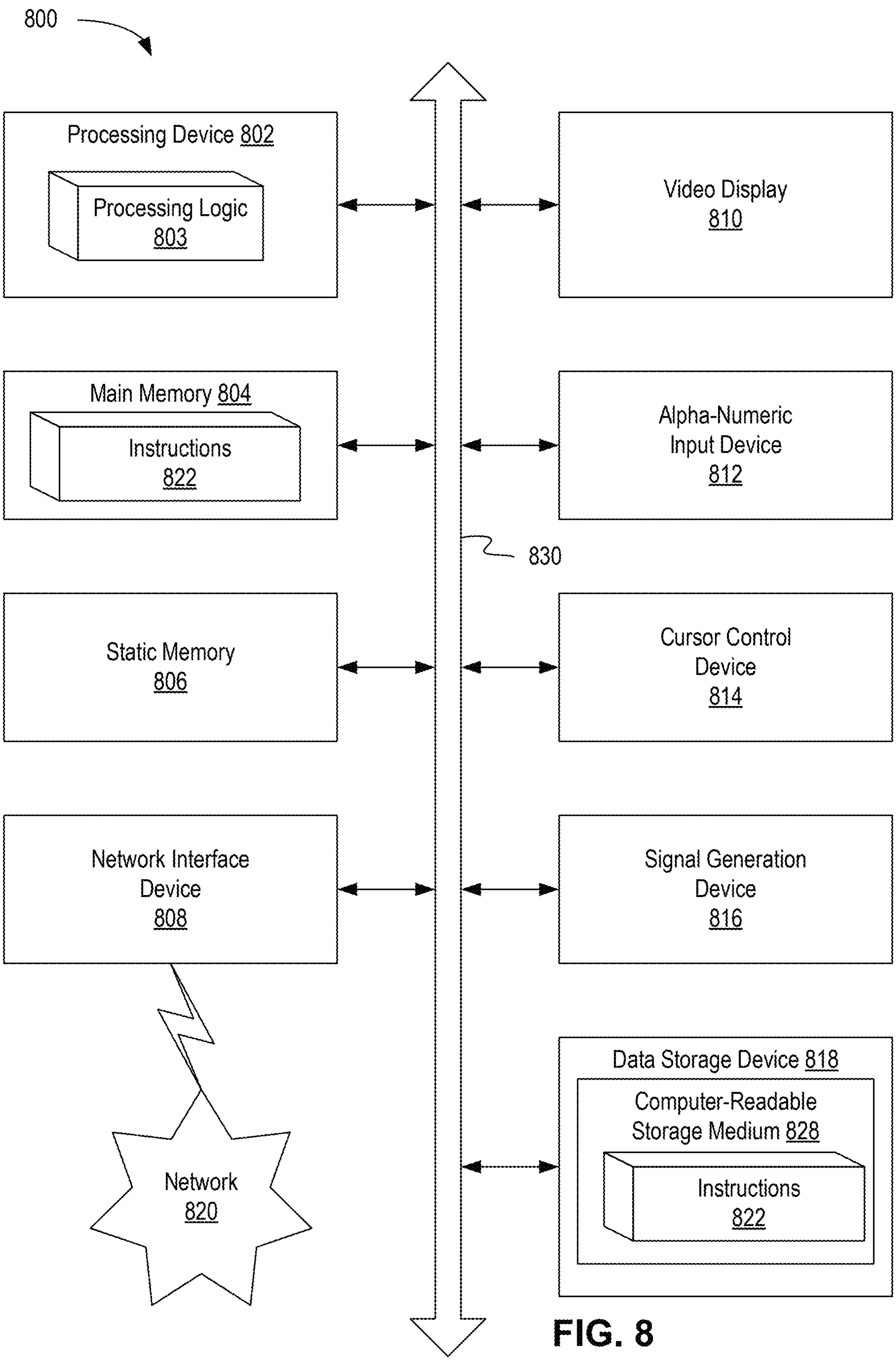
FIG. 8 depicts a block diagram of an example computer device capable of training and/or deploying machine learning models to predict likelihoods of presence of target objects in occluded areas of driving environments, in accordance with some implementations of the present disclosure.

FIG. 8 depicts a block diagram of an example computer device 800 capable of training and/or deploying machine learning models to predict likelihoods of presence of target objects in occluded areas of driving environments, in accordance with some implementations of the present disclosure. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830. In some implementations, processing device 802 may be or include processor 128 of FIG. 1 and main memory 804 can be or include system memory 126 in FIG. 1.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 700 of training and deploying machine learning models to predict likelihoods of presence of target objects in occluded areas of driving environments.

Example computer device 800 can further include a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 700 of training and deploying machine learning models to predict likelihoods of presence of target objects in occluded areas of driving environments.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:

training, using perception data associated with a first driving scene, a teacher machine learning model to determine a location, within the first driving scene, of a target object masked with a masking transformation, wherein the masking transformation comprises shifting the target object away from the location of the target object, and wherein training the teacher machine learning model comprises reversing the masking transformation to determine the location of the target object;

training, using an output of the teacher machine learning model for a training driving scene, a student machine learning model to generate a map of probabilities of one or more target objects to be in an occluded region of the training driving scene, the training driving scene comprising at least one of the first driving scene or a second driving scene; and causing the student machine learning model to be deployed on an autonomous vehicle.

2. The method of claim 1, wherein the perception data associated with the first driving scene comprises:

context data comprising locations and types of objects in the first driving scene; and roadgraph data representing one or more drivable lanes in the first driving scene.

3. The method of claim 1, wherein the masking transformation comprises a plurality of random shifts of the target object sampled from a reference distribution.

4. The method of claim 3, wherein the teacher machine learning model comprises a diffusion model and wherein training the teacher machine learning model comprises reversing the plurality of random shifts.

5. The method of claim 1, wherein training the student machine learning model comprises:

processing, using the teacher machine learning model, the training driving scene to obtain the output of the teacher machine learning model that comprises a reference map of probabilities of the one or more target objects to be in the occluded region of the training driving scene; and using the reference map of probabilities as ground truth in training of the student machine learning model.

6. The method of claim 5, wherein using the reference map of probabilities as ground truth in training of the student machine learning model comprises:

changing one or more parameters of the student machine learning model to reduce a loss value characterizing a difference between the map of probabilities generated by the student machine learning model and the reference map of probabilities generated by the teacher machine learning model.

7. The method of claim 1, further comprising:

processing, using the student machine learning model, live perception data associated with a live driving scene to generate a live map of probabilities for one or more live target objects to be in an occluded region of the live driving scene; and causing the autonomous vehicle to perform an avoidance action based on the live map of probabilities.

8. The method of claim 7, wherein causing the autonomous vehicle to perform the avoidance action comprises:

determining that an individual probability of the live map of probabilities is above a threshold probability.

9. The method of claim 8, wherein the threshold probability depends on at least one of:

a distance between the autonomous vehicle and a location associated with the individual probability, a type of the autonomous vehicle, or a condition of a driving surface of the live driving scene.

10. A system comprising:

a memory device; and one or more processing devices communicatively coupled to the memory device, the one or more processing devices to:

train, using perception data associated with a first driving scene, a first machine learning model to determine a location, within the first driving scene, of a target object masked with a masking transformation, wherein training the first machine learning model comprises reversing the masking transformation;

train, using an output of the first machine learning model for a training driving scene, a second machine learning model to generate a map of probabilities of one or more target objects to be in an occluded region of the training driving scene, the training driving scene comprising at least one of the first driving scene or a second driving scene; and cause the second machine learning model to be deployed on an autonomous vehicle.

11. The system of claim 10, wherein the perception data associated with the first driving scene comprises:

context data comprising locations and types of objects in the first driving scene; and roadgraph data representing one or more drivable lanes in the first driving scene.

12. The system of claim 10, wherein the masking transformation comprises a plurality of random shifts of the target object sampled from a reference distribution.

13. The system of claim 12, wherein the first machine learning model comprises a diffusion model and wherein to train the first machine learning model, the one or more processing devices are to reverse the plurality of random shifts.

14. The system of claim 10, wherein to train the second machine learning model, the one or more processing devices are to:

process, using the first machine learning model, the training driving scene to obtain the output of the first machine learning model that comprises a reference map of probabilities of the one or more target objects to be in the occluded region of the training driving scene; and use the reference map of probabilities as ground truth in training of the second machine learning model.

15. The system of claim 14, wherein to use the reference map of probabilities as ground truth in training of the second machine learning model, the one or more processing devices are to:

change one or more parameters of the second machine learning model to reduce a loss value characterizing a difference between the map of probabilities generated by the second machine learning model and the reference map of probabilities generated by the first machine learning model.

16. A computing system of a fleet of autonomous vehicles, comprising:

a first memory device; and a first processing device communicatively coupled to the first memory device, the first processing device to:

train, using perception data associated with a first driving scene, a teacher machine learning model to determine a location, within the first driving scene, of a target object masked with a masking transformation;

train, using an output of the teacher machine learning model for a training driving scene, a student machine learning model to generate a map of probabilities of one or more target objects to be in an occluded region of the training driving scene, the training driving scene comprising at least one of the first driving scene or a second driving scene; and cause the student machine learning model to be deployed on an autonomous vehicle of the fleet of autonomous vehicles.

17. The computing system of claim 16, wherein the masking transformation comprises a plurality of random shifts of the target object sampled from a reference distribution, and wherein the teacher machine learning model comprises a diffusion model and wherein to train the teacher machine learning model, the first processing device is to reverse the plurality of random shifts.

18. The computing system of claim 16, wherein to train the student machine learning model, the first processing device is to:

process, using the teacher machine learning model, the training driving scene to obtain the output of the teacher machine learning model that comprises a reference map of probabilities of the one or more target objects to be in the occluded region of the training driving scene; and use the reference map of probabilities as ground truth in training of the student machine learning model.

19. The computing system of claim 16, further comprising:

a second memory device of the autonomous vehicle of the fleet of autonomous vehicles; and a second processing device of the autonomous vehicle, the second processing device communicatively coupled to the second memory device, the second processing device to:

process, using the student machine learning model, live perception data associated with a live driving scene to generate a live map of probabilities for one or more live target objects to be in an occluded region of the live driving scene;

determine that an individual probability of the live map of probabilities is above a threshold probability; and cause the autonomous vehicle to perform an avoidance action based on the individual probability.

20. The computing system of claim 19, wherein the threshold probability depends on at least one of:

a distance between the autonomous vehicle and a location associated with the individual probability, a type of the autonomous vehicle, or a condition of a driving surface of the live driving scene.

* * * * *